(12) United States Patent
Porchia et al.

(10) Patent No.: US 6,913,255 B2
(45) Date of Patent: Jul. 5, 2005

(54) CORRUGATED PAPERBOARD CUTTING BOARD

(75) Inventors: Jose Porchia, Milwaukee, WI (US); Barry T. Calpino, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 82 days.

(21) Appl. No.: 10/428,435

(22) Filed: May 2, 2003

(65) Prior Publication Data

US 2004/0007804 A1 Jan. 15, 2004

Related U.S. Application Data

(60) Provisional application No. 60/377,894, filed on May 3, 2002.

(51) Int. Cl.[7] ................................................. B23Q 3/00
(52) U.S. Cl. ................................ 269/289 R; 269/302.1
(58) Field of Search .......................... 269/289 R, 302.1, 269/303, 315, 13, 15

(56) References Cited

U.S. PATENT DOCUMENTS

| 5,190,213 | A | * | 3/1993 | Horwitz ....................... 229/152 |
| 5,577,989 | A | | 11/1996 | Neary |
| RE35,830 | E | | 6/1998 | Sadlier |
| 6,135,288 | A | | 10/2000 | Kim |
| 6,164,478 | A | | 12/2000 | Cant |
| 6,179,203 | B1 | * | 1/2001 | Toussant et al. ........ 229/122.34 |
| D441,261 | S | * | 5/2001 | Stein ........................... D7/698 |
| 6,422,551 | B1 | | 7/2002 | Brotz |
| 6,491,214 | B2 | | 12/2002 | Plummer et al. |
| 6,617,004 | B2 | * | 9/2003 | Lake et al. .................. 428/138 |

FOREIGN PATENT DOCUMENTS

| DE | 296 02 348 U1 | 5/1996 |
| WO | WO 99/53810 | 10/1999 |
| WO | WO 02/30783 A1 | 4/2002 |

* cited by examiner

Primary Examiner—Lee D. Wilson

(57) ABSTRACT

A disposable cutting board may be constructed from corrugated paperboard having one or more layers of corrugations. A first layer of corrugations may have relatively small and tightly spaced flutes to provide the board with strength and rigidity, and a second layer may have relatively large flutes to provide the board with cushioning against knife impact and protection of the underlying surface. The flutes may be parallel or transverse, while more than two layers may be provided.

31 Claims, 2 Drawing Sheets

CORRUGATED PAPERBOARD CUTTING BOARD

CROSS-REFERENCE TO RELATED APPLICATION

This application claims the priority benefits of provisional U.S. patent application Ser. No. 60/377,894, filed May 3, 2002.

FIELD OF THE DISCLOSURE

The disclosure generally relates to cookware and, more particularly, relates to cutting boards.

BACKGROUND OF THE DISCLOSURE

Cutting boards are well known kitchen aids used to provide a solid surface for food preparation while protecting the underlying countertop, table, or the like from damage. The board absorbs the impact and shearing of the knife or other utensil being used without allowing the utensil to contact the underlying surface.

Conventionally, such boards have been made of wood or stone such as granite. While such materials provide a hardness level desirable in terms of cut resistance and rigidity, they are also sufficiently porous to allow for liquid or other matter to seep therein. Over time and repeated usage, such absorption can lead to discoloration or contamination in terms of bacteria or mold growth. Even with regular washings, the board, once used, may be less than sterile.

More recently, boards made of hard plastics, such as polypropylene or the like, have been employed. Such materials do provide a less porous and more easily sterilizable surface, but often offer less cut resistance and thus can quickly become marred or otherwise defaced. In addition, to certain consumers such materials are less aesthetically appealing than wood or stone, a particularly important criteria when purchasing a relatively low cost item.

In still further forms, cutting boards have begun to be provided in a completely disposable fashion. More specifically, the boards are designed to be used once and discarded. In order to make such a board, cost must be kept sufficiently low so as to allow the user to feel comfortable in throwing the item away after each use. At the same time, the board must be made of a material providing high cut resistance. Since the board is designed to be disposable, fluid imperviousness is not necessarily of concern, but fluid absorption, for purposes of ease of cleaning, may be desirable.

SUMMARY OF THE DISCLOSURE

In accordance with one aspect of the disclosure, a disposable cutting board may be provided and formed from corrugated paperboard. The corrugated paperboard may be provided with one or more layers of flutes or corrugations. A first layer may be provided with relatively small, tightly grouped flutes to provide the board with strength and rigidity, while a second layer may include relatively large flutes to serve as a cushion against knife impact and surface protection.

In accordance with another aspect of the disclosure, a disposable cutting board is disclosed which comprises a top surface, a bottom surface and a first layer of corrugations positioned between the top surface and the bottom surface.

In accordance with another aspect of the disclosure, a disposable cutting board is disclosed which comprises a top surface, a bottom surface and a plurality of layers of corruations positioned between the top surface and the bottom surface.

In accordance with a still further aspect of the disclosure, a cutting board is disclosed which comprises a cutting surface, means for reinforcing the cutting surface and means for absorbing. The means for reinforcing and the means for absorbing are operatively associated with the cutting surface with each of the cutting surface, means for reinforcing and means for absorbing being manufactured of cellulosic material.

These and other aspects and features of the disclosure will become more apparent upon reading the following detailed description when taken in conjunction with the accompanying drawings.

Figure 1:
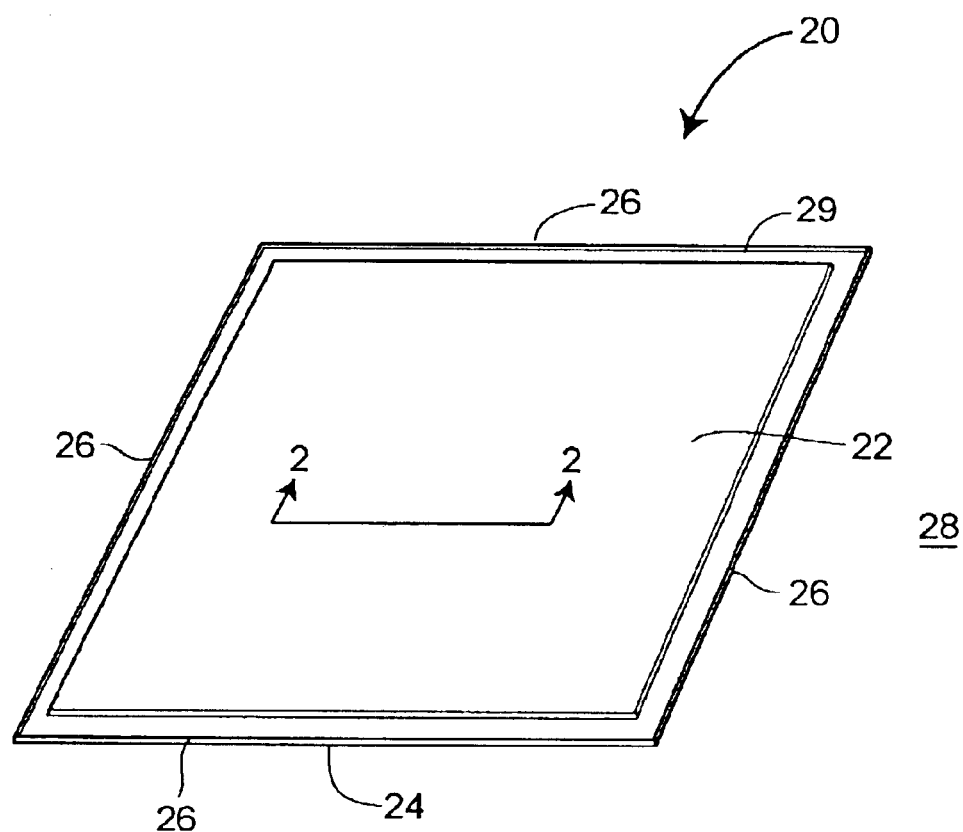
FIG. 1 is an isometric view of a disposable cutting board constructed in accordance with the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure.

DETAILED DESCRIPTION OF THE DISCLOSURE

Referring now to the drawings, and with specific reference to FIG. 1, a disposable cutting board constructed in accordance with the teachings of the disclosure is generally referred to by reference numeral 20. While the cutting board 20 is depicted in generally rectangular shape, it is to be understood that the board could be constructed in any conceivable shape including, but not limited to, circles, ellipses, triangles, and other multi-sided polygons, as well as three dimensional shapes including those for plates, bowls, pans, and the like.

The board 20 may include a top surface 22, a bottom surface 24, and a plurality of side edges 26. The bottom surface 24 is designed to rest against a surface 28 to be protected, such as a countertop, table, or the like. The top surface 22 is designed to have items to be cut or otherwise prepared placed thereon. The items, while not depicted may include food items to be cut, such as but not limited to meats, vegetables, and fruits. The board 20 is designed to prevent a utensil, such as knife or the like from penetrating therethrough and damaging the surface 28, while still enabling the item to be processed.

While the board 20 is made of a corrugated material as will be described in greater detail herein, it may also include a pressed perimeter 29. The pressing of the perimeter 29 not only provides an orderly aesthetic feature, but also inhibits the individual layers of the board 20 from coming apart or otherwise deforming. Such pressing can be accomplished by any conventional method such as, but not limited to, adhesives, compressing under heat, moisture and pressure, or the like. In a variation on such a feature, the pressed area 29 could be moved slightly inwardly from the perimeter of the board 29. In so doing, liquid resulting from food processing and which is not able to be absorbed by the board 20, e.g., a relatively viscous liquid, can navigate toward, and be retained within, such a depressed area or channel 29.

Figure 2:
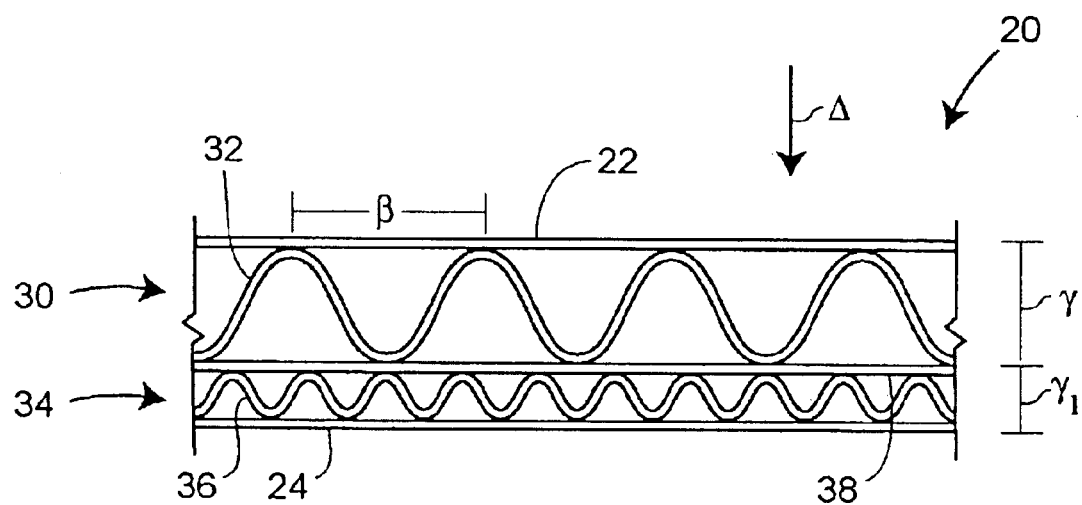
FIG. 2 is sectional view of the board of FIG. 1, taken along line 2—2 of FIG. 1.

Referring now to FIG. 2, the board 20 is shown in cross-sectional view. As depicted therein, the board 20 includes a first layer 30 of corrugations or flutes 32, and a second layer 34 of corrugations or flutes 36. A separation layer or separator 38 may be provided between the first and second layers 30, 34. The separator 38, top surface 22, bottom surface 24, first layer 30 and second layer 34 may all be made from the same cellulosic material such as various grades of paper, fiberboard, particle board, veneer, or the like. The layers can be made of differing types of cellulosic material as well. The layers may also be made of other materials including, but not limited to, polypropylene, other plastics, and the like.

As can clearly be seen in FIG. 2, in the first embodiment, the corrugations 32 of the first layer 30 are provided at a lesser frequency $\alpha$, longer wavelength $\beta$, and greater amplitude $\gamma$ than the corrugations 36 of the second layer 34. Among other things, such structure enables the first layer 30 to provide a high level of knife cushioning to absorb the impact of the knife (not shown) being used against the top surface 22. More specifically, the added depth afforded by the large corrugations 32 provides relatively large voids 40 filled with air. As the knife imparts force in the direction of arrow $\Delta$, the corrugations 32 deform into the voids 40, thereby absorbing the force of the knife and lessening the likelihood of the knife cutting through the board 20 and into the surface 26.

Such structure also results in a relatively stiff or rigid board 20, thereby facilitating retention of a basically planar shape. In other words, when a knife or the like is drawn across the board 20, such rigidity enables the board to remain flat and not crumple or tear. The board 20 is able to do so, at least in part, due to the relatively small size and tight spacing of the corrugations 36. As shown in FIG. 2, the corrugations 36 have an amplitude $\gamma_1$ less than, a frequency $\alpha_1$ greater than, and a wavelength $\beta_1$ shorter than, the corrugations 32. In so doing, less void space is created and more paper is provided per volume in the second layer 34, as opposed to the first layer 30. The second layer 34 is thus more rigid than the first layer 30. The combination of two layers of differing rigidity also results in a board 20 less likely to bend, or otherwise deform. It is to be understood that any combination of layers, having various amplitudes, frequencies, or wavelengths could be incorporated in the embodiments of this disclosure.

Figure 3:
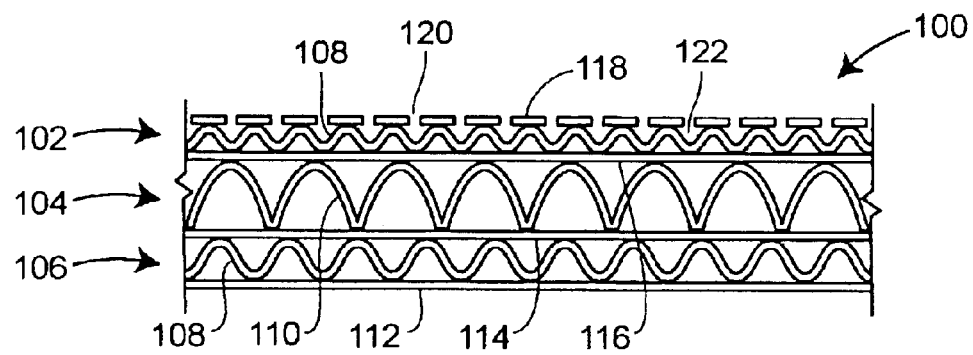
FIG. 3 is a sectional view of an alternative embodiment of a cutting board constructed in accordance with the teachings of the disclosure.

Turning now to FIG. 3, an alternative embodiment is shown as a board 100. The board 100 may include first, second and third layers 102, 104, and 106. The first layer 102 and third layer 106 may include corrugations 108 of substantially the same size and shape, while the second or middle layer 104 may include corrugations 110 of a slightly larger size. Moreover, the board 100 may include a bottom wall 112, and first and second intermediate walls 114 and 116. The board 100 may be provided with a top wall 118 having a plurality of perforations 120, or without a top wall at all.

In providing such a structure, multiple enhancements can be realized. The addition of another layer of corrugations provides for added rigidity and cut resistance. Moreover, the plurality of perforations 120 provides a mechanism by which liquids resulting from food preparation can drain into the board 100. The liquid can then be retained in voids 122 between the corrugations 108, or the middle layer 104 can be made of an absorbent grade paper or other material to absorb and retain the liquid. In so doing, the top layer 102 can be kept dry, while the board 100 maintains rigidity, and the work surface on which the board 100 is placed is kept clean. By keeping the top layer 102 dry, the tendency of the top layer to rip, or for paper fibers to otherwise dislodge and be transferred to the food being prepared, is abated.

Further variations of such a theme are certainly possible and encompassed within the scope of this disclosure. For example, more than three layers, or less than two layers, could be provided to produce a board having a rigidity and cut resistance tailored to a particular application or price point. Moreover, the amplitudes, frequencies and wavelengths of each of the corrugations could be altered depending on such identified design criteria.

Figure 4:
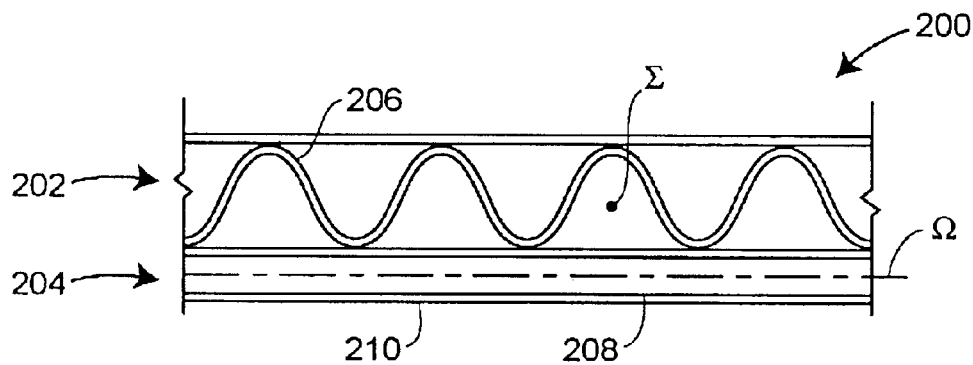
FIG. 4 is a sectional view of a second alternative embodiment of a cutting board constructed in accordance with the teachings of the disclosure.

A second alternative embodiment is shown in FIG. 4 as a board 200. While the board 200 still includes a plurality of layers 202 and 204, it will be noted that a longitudinal axis $\Sigma$ of the corrugations 206 of the first layer 202 are transverse to a longitudinal axis $\Omega$ of the corrugations 208 of the second layer 210. The corrugations 206 of the first layer 202 are depicted being perpendicular to the corrugations 208 of the second layer 210, but it is to be understood that the multiple layers of corrugations could be provided in otherwise transverse orientations such as, but not limited to, forty five degree cants or the like. Such transverse flutes provide the board 200 with increased rigidity and cut resistance. In addition, the features of the board 200 could be combined with the features of the board 20 and/or the board 100 to result in the benefits of other designs as well.

Figure 5:
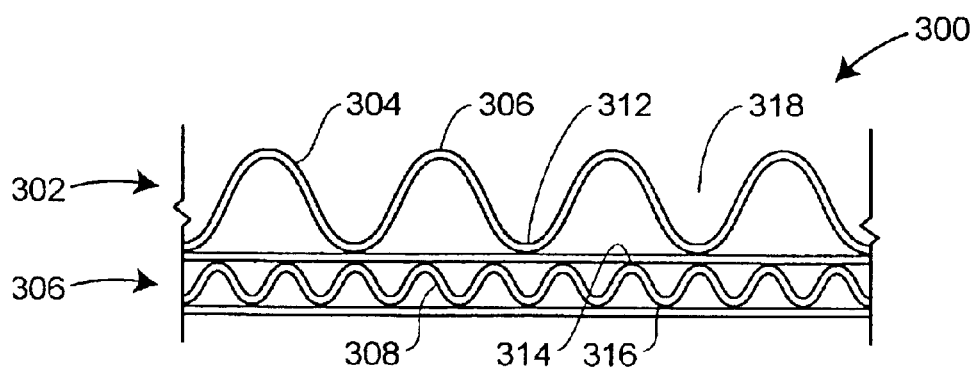
FIG. 5 is a sectional view of a third alternative embodiment of a cutting board constructed in accordance with the teachings of the disclosure.

A still further or third alternative embodiment is depicted in FIG. 5 as a board 300. This third alternative embodiment illustrates that not only can the amplitude $\gamma$, frequency $\alpha$, and wavelength $\beta$ of the corrugations be altered, but the phase of each set of corrugations can be varied with respect to the phases(s) of other set(s) of corrugations as well. As shown in FIG. 5, the board 300 may include a first layer 302 having corrugations 304, and a second layer 306 having corrugations 308. Each corrugation 304 includes an upper apex 310 and a lower apex 312, while each corrugation 308 includes an upper apex 314 and a lower apex 316. Each lower apex 312 is provided adjacent an upper apex 314. Since the corrugations are provided at the same amplitude, frequency, and wavelength, the first layer 302 of corrugations 304 is one hundred and eighty degrees out-of-phase with the corrugations 308 of the second layer 306. In so doing, the board 300 is provided with enhanced rigidity and strength. The layers can also be provided out of phase with respect to one another in less than, or more than, one hundred and eighty degree increments.

It will also be noted that the board 300 is provided without a top layer or surface. The liquid resulting from food processing on the board 300 can therefore drain into voids 318 and/or into the second layer 306. In so doing, the board 300 is not only cut resistant and relatively rigid, but moisture absorbent as well. As with the other embodiments, the features of the board 300 can be combined with any or all of the features of the other embodiments depending on design and cost criteria.

In still further embodiments, the corrugations of one layer could lie in a plane coplanar with the plane of the cutting board as a whole, while the corrugations of another layer may lie in a plane transverse to that plane. The various layers of the board could also be coated with any coating of preference including, but not limited to, those making the board hydrophilic, hydrophobic, oliophilic, or oliophobic. Alternatively, one or more of such properties could be incorporated into the board at different portions thereof so as to direct water-based and/or oil-based fluids toward a particular position. Also, one or more layers could be corrugated while one or more other layers might be non-corrugated, but wherein each of the latter has structures (such as stand-offs) that space face portions of one layer from another. Channels may be provided through one or both of such face portions to allow liquids to pass therethrough with absorbent material being disposed in such spaces between the structures and face portions to retain the liquid. Alternatively, the spaces may not have any material therein so that fluid is able to flow into and be retained in the spaces by capillary action. A slightly different approach would be to have first and second corrugated layers separated by a perforated or non-perforated planar layer of any suitable material. As mentioned with regard to the above-described figures, it is to be understood that any combination of layers, having various amplitudes, frequencies, or wavelengths could be incorporated in the embodiments of this disclosure.

In order to form the shape of the cutting board 20, a conventional thermoforming process can be used. In such a process paperboard, which has already been corrugated to have the desired number of layers and corrugations of the desired shape and size, is subjected to a thermoforming mold. First and second dies (not shown) having a mating protrusion and cavity in the desired shape are provided, with the corrugated paperboard being positioned therebetween. The paperboard is compressed between the dies under heat and pressure sufficient to deform the paperboard into a shape congruent with the dies. Upon retraction of the dies, the paperboard retains the desired shape, whereupon the edges thereof can be trimmed or otherwise finished for sale.

From the foregoing, it will be appreciated by those of ordinary skill in the art, that a disposable paperboard cutting board can be constructed from the teachings provided herein. Moreover, those of ordinary skill in the art will understand that variations on the embodiments disclosed herein can be made without departing from the spirit and scope of the disclosure.

What is claimed is:

1. A disposable cutting board, comprising:
   a perforated top surface;
   a bottom surface; and
   a first layer of corrugations positioned between the top surface and the bottom surface.

2. The cutting board of claim 1, wherein the top surface, bottom surface, and layer of corrugations are pressed together at a perimeter of the cutting board.

3. The cutting board of claim 2, wherein the perimeter forms a shape selected from the group of shapes including rectangles, circles, ellipses, triangles, and polygons of more than four sides.

4. The cutting board of claim 1, wherein the top surface, bottom surface and first layer of corrugations are pressed together at an area inward of a perimeter of the board.

5. The cutting board of claim 1, wherein at least one of the top surface, bottom surface, or first layer is made of cellulosic material.

6. The cutting board of claim 5, wherein the cellulosic material is paper, fiberboard, particle board, or veneer.

7. The cutting board of claim 1, wherein at least one of the top surface, bottom surface, or first layer is made of plastic material.

8. The cutting board of claim 1, wherein at least one of the top surface, bottom surface, or first layer is provided with a coating material.

9. The cutting board of claim 8, wherein the coating material is selected from the group of coating including hydrophilic, hydrophobic, oliophilic, and oliophobic coatings.

10. The cutting board of claim 1, wherein voids are created by the corrugations in the first layer, and wherein an absorbent material is provided in the voids.

11. A disposable cutting board, comprising:
    a top surface;
    a bottom surface;
    a plurality of layers of corrugations positioned between said top surface and said bottom surface; and
    a separation layer provided between the layers of corrugations.

12. The cutting board of claim 11, wherein the top surface, bottom surface, and layer of corrugations are pressed together at a perimeter of the cutting board.

13. The cutting board of claim 11, wherein the top surface, bottom surface and first layer of corrugations are pressed together at an area inward of a perimeter of the board.

14. The cutting board of claim 12, wherein the perimeter forms a shape selected from the group of shapes including rectangles, circles, ellipses, triangles, and polygons of more than four sides.

15. The cutting board of claim 11, wherein at least one of the top surface, bottom surface, or layers is made of cellulosic material.

16. The cutting board of claim 15, wherein the cellulosic material is paper, fiberboard, particle board, or veneer.

17. The cutting board of claim 11, wherein at least one of the top surface, bottom surface, or layers is made of plastic material.

18. The cutting board of claim 11, wherein voids are defined by corrugations in at least one of the layers, and wherein an absorbent material is provided in the voids.

19. The cutting board of claim 11, wherein a longitudinal axis of at least one of the layers of corrugations is positioned transverse to a longitudinal axis of another layer of corrugations.

20. The cutting board of claim 11, wherein at least one layer of corrugations has a longitudinal axis positioned perpendicular to a longitudinal axis of a different layer of corrugations.

21. A disposable cutting board comprising:
    a perforated top surface;
    a bottom surface; and
    a plurality of layers of corrugations positioned between said top surface and said bottom surface.

22. A disposable cutting board comprising:
    a top surface;
    a bottom surface; and
    a plurality of layers of corrugations positioned between said top surface and said bottom surface, wherein the corrugations of one of the layers are provided at a first wavelength and the corrugations of another layer are provided at a second wavelength, the first and second wavelengths being different.

23. A disposable cutting board comprising:
    a top surface;

a bottom surface; and a plurality of layers of corrugations positioned between said top surface and said bottom surface, wherein the corrugations of one of the layers are provided at a first frequency and the corrugations of another layer are provided at a second frequency, the first and second frequencies being different.

24. A disposable cutting board comprising:

a top surface;

a bottom surface; and a plurality of layers of corrugations positioned between said top surface and said bottom surface, wherein the corrugations of one of the layers are provided at a first amplitude and the corrugations of another layer are provided at a second amplitude, the first and second amplitudes being different.

25. A disposable cutting board comprising:

a top surface;

a bottom surface; and a plurality of layers of corrugations positioned between said top surface and said bottom surface, wherein at least one of the layers of corrugations is positioned out-of-phase with another layer of corrugations.

26. A disposable cutting board comprising:

a top surface;

a bottom surface; and a plurality of layers of corrugations positioned between said top surface and said bottom surface, wherein at least one of the layers of corrugations is positioned one hundred and eighty degrees out-of-phase with the corrugations of an adjacent layer.

27. A cutting board, comprising:

a perforated cutting surface;

means for reinforcing the cutting surface, operatively associated with the cutting surface; and means for absorbing, operatively associated with the cutting surface, the cutting surface, means for reinforcing, and the means for absorbing all being manufactured of a cellulosic material.

28. The cutting board of claim 27, wherein the means for reinforcing is provided in the form of a corrugated layer.

29. The cutting board of 28, wherein the corrugated layer serves as the cutting surface.

30. The cutting board of claim 27, wherein the means for absorbing is provided in the form of a corrugated layer of cellulosic material.

31. The cutting board of 27, wherein the cutting surface, the means for reinforcing, and the means for absorbing share a pressed perimeter.

\* \* \* \* \*